Patented June 27, 1944

2,352,461

UNITED STATES PATENT OFFICE 2,352,461

HIGH MOLECULAR WEIGHT UNSATURATED ORGANIC ACIDS AND PROCESS OF PREPARING THEM

Joseph Frederic Walker, Lewiston, N. Y., assignor to E. I. du Pont de Nemours & Company, Wilmington, Del., a corporation of Delaware No Drawing. Application February 25, 1942, Serial No. 432,359

12 Claims. (Cl. 260—537)

This invention relates to organic acids and their preparation by reacting conjugated diolefines with sodium or potassium and carbon dioxide.

It is an object of this invention to prepare organic acids and mixtures thereof by reacting acyclic, aliphatic, conjugated diolefines; sodium or potassium; and carbon dioxide. A further object is to provide a method of carrying out such reactions whereby organic acids and mixtures thereof may be obtained as valuable products. Other objects will be apparent from the ensuing description of the invention.

The above objects may be accomplished in accordance with the invention by reacting an acyclic, aliphatic, conjugated diolefine; sodium or potassium; and carbon dioxide in a special solvent of the type defined below. The method may be carried out by first reacting the diolefine with the alkali metal and then reacting the resultant product with carbon dioxide. Preferably, however, the reactions involving the alkali metal and carbon dioxide are carried out simultaneously after which the resulting salt products may be converted to acids and the latter isolated, or the salt products may be separated as such and then converted to acids.

Although the solvents which have been found to be suitable for the present purpose are all ethers, it has been discovered that only certain definite types or classes of ethers are effective. The solvent may be any aliphatic mono ether having a CH$_3$—O— group, in which ether the ratio of the number of oxygen atoms to the number of carbon atoms is not less than 1:4. Examples of suitable mono ethers are dimethyl ether, methyl ethyl ether, methyl normal propyl ether, methyl isopropyl ether and mixtures of these with other solvents. Other ethers which are suitable for the present purpose are those aliphatic poly ethers, including acyclic and cyclic poly ethers, which are fully alkylated products of polyhydric alcohols such as the glycols and glycerols. Included are ethers from the hypothetical polyhydric alcohols such as methylene glycol or others having more than one hydroxyl group on the same carbon atom, e. g. ethyl and methyl ortho formates, methylal and other acetals. Examples of other poly ethers which may be used are: the ethylene glycol dialkyl ethers such as the dimethyl, methyl ethyl, diethyl, methyl butyl, ethyl butyl, dibutyl and butyl lauryl ethylene glycol ethers; trimethylene glycol dimethyl ether, glycerol trimethyl ether, glycerol dimethyl ethyl ether, and diethylene glycol methyl ethyl ether; dioxane, glycol formal, methyl glycerol formal and the like. In the case of ethers of polyhydric alcohols such as the glycerols, the ether oxygen atoms may be on adjacent carbon atoms, as in the diethers of ethylene glycol or 1,2 propylene glycol, or they may be separated as in the diethers of 1.3 propylene glycol. These poly ethers give better results than the mono ethers and of the poly ethers the ethylene glycol dialkyl ethers, particularly ethylene glycol dimethyl ether, are preferred. Ordinary diethyl ether is entirely ineffective for the present purpose as are also various hydrocarbon solvents such as benzene. So far as is now known the solvents which are effective for the present purpose are restricted to the two classes of ethers defined above.

Those ethers which are suitable for the present purpose must not be reactive to any substantial extent with the alkali metal under the conditions of the reaction. It is not meant by this that they may not react in some way in some reversible reaction with the alkali metal or reaction products thereof, since indications are that the ethers which are effective may take part in the reaction to some extent, but the ether must not be broken up or form irreversible reaction products at a rate comparable with the rate of the desired reaction. The ethers should, however, not contain any groups such as the hydroxyl, carboxyl and the like groups, which are distinctly reactive towards sodium.

While it is preferred to employ ethers of the above types, or mixtures thereof, alone as reaction media, such ethers may be diluted if desired with various other solvents such as benzene, toluene, diethyl ether and the like, which solvents alone are ineffective for the present purpose. The effect of diluting the present ethers with materials such as benzene or diethyl ether is usually to decrease the rate of reaction. In general as the concentration of the present types of ether is decreased by such dilution, a minimum concentration is reached below which the ether will have no practical promoting effect. This minimum concentration will depend upon the particular reactants and ether employed and will vary to some extent with the particular reaction conditions such as temperature, concentration of reactants, etc. Accordingly the concentration of the ether in the reaction mixture should at all times be sufficient to have a substantial promoting effect upon the desired reaction.

Any aliphatic acyclic conjugated diolefine, such as butadiene, isoprene and 2,3-dimethyl butadiene, may be used in practicing this invention. The method is particularly applicable when using butadiene as the diolefine.

While either sodium or potassium may be used as a reactant, not all alkali metals are suitable. Thus lithium has been found to be ineffective in that substantially no acid products have been found to be produced when that metal is employed in place of sodium under substantially identical conditions. The use of sodium is preferred over potassium because sodium is cheaper and more readily available.

The following equations, in which sodium and butadiene are used as typical alkali metal and diolefine reactants, suggest a possible mechanism for the reactions believed to be involved in the present method.

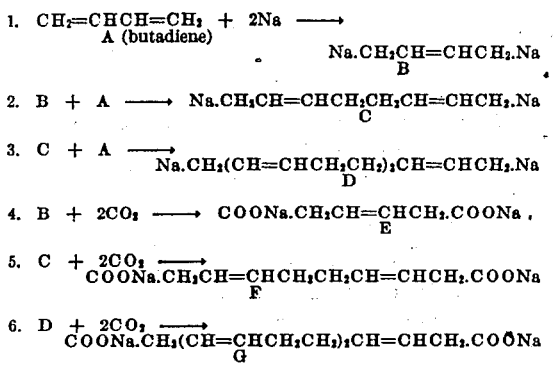

According to the above equations the sodium and butadiene first react to form a disodium addition product (B) which compound may then react with either carbon dioxide according to Equation 4 or with a molecule of butadiene according to Equation 2 to form the disodium hydrocarbon indicated by formula C. Compound C may in turn react with either carbon dioxide according to Equation 5 or with a molecule of butadiene according to Equation 3 to form a disodium hydrocarbon of formula D. Compound D may then react further with carbon dioxide according to Equation 6 or with another molecule of butadiene. Still higher molecular weight salts of acids of the type represented by compounds E, F and G, or disodium hydrocarbon compounds of the type represented by compounds B, C and D, may be formed by reactions involving more carbon dioxide or butadiene, respectively.

Products E, F and G in the above equations are salts of unsaturated dicarboxylic acids whose carbon length depends upon the length of the carbon chain in the disodium hydrocarbon which is carbonated. Since disodium hydrocarbons of various carbon lengths undoubtedly exist in the reaction mixture at any one time, the final acid product most likely consists of a mixture of several acids. Indications are that the acids are chiefly unsaturated dicarboxylic acids, although it is possible that carbonation of a given disodium hydrocarbon constituent of the reaction mixture may involve only one sodium atom with the result that, upon hydrolysis of the reaction mixture, substantial amounts of mono carboxylic acids will be present in the mixture of acids obtained. But regardless of any theories along this line, the products have been found to be mixtures of acids from which it is difficult to isolate individual acids in any degree of purity. Mixed acids products in the form of yellow brown oils possessing average molecular weights of 200 to 500 and higher have been obtained by practicing the present method.

While the acid products are apparently mixtures of unsaturated acids of high and low molecular weights, it is possible to control to some extent the proportions of high and low molecular weight products contained in the mixtures. It has been found that if sodium and butadiene are allowed to react to a substantial extent before admitting carbon dioxide to the reaction mixture, the final mixture of acids will contain relatively large amounts of the higher molecular weight acids. On the other hand if all three reactants are reacted simultaneously the proportion of low molecular weight acids is increased. The temperature at which the reaction is carried out also influences to a certain extent the molecular weight, the average molecular weight of the mixture of acids varying inversely with the temperature at which the reaction is carried out. Another factor influencing to some extent the molecular weight is the concentration of butadiene in the reaction mixture. In general the lower the concentration of butadiene the lower will be the average molecular weight of the product.

In one method of practicing the invention butadiene and sodium are permitted to react in the ether medium to a considerable extent before admitting carbon dioxide. Under these conditions the reaction is generally slow. A better method involves carrying out the reaction between sodium and butadiene while simultaneously and continuously passing carbon dioxide into the reaction mixture. Reaction between sodium and butadiene is evidenced by the appearance of a golden yellow color particularly in that portion of the reaction mixture adjacent to surfaces of the sodium. The carbon dioxide should be passed into the mixture at such a rate that the yellow color is not quite completely discharged. Since carbonation occurs mostly on the surface of the sodium, the rate of reaction is controlled by controlling the amount of sodium surface exposed. Effective agitation of the reaction mixture is, therefore, desired. Best results are obtained by passing carbon dioxide into the mixture during the entire reaction period, during which time the mixture is agitated and the sodium is subjected to an abrading or scraping treatment. This may be done by forcing relatively large pieces of sodium in the mixture against a rotating brush or scraper which acts to remove continuously encrustations from the sodium and expose fresh surfaces of the metal.

When the reaction is complete the reaction mixture is filtered to remove solids or sludge which will contain practically all of the desired reaction products. These solids are treated with an excess of alcohol to decompose unreacted sodium metal. The solution is then acidified to obtain a mixture of acids. Alternatively, the entire reaction mixture may be treated with alcohol to decompose sodium and then acidified, after which the acid products may be isolated by the usual extraction methods.

The invention is illustrated by the following example:

*Example*

Butadiene (one mole) was dissolved in one liter of ethylene glycol dimethyl ether contained in a reaction vessel provided with a rotating metal scraper extending to the bottom of the vessel, a thermometer, a tube for admitting carbon dioxide to the bottom portion of the vessel, and a tube for venting carbon dioxide from the container. While keeping the mixture at a temperature of about 0° C., sodium strips (two moles) were pressed against the rotating scraper in the reaction vessel so that the sodium was gradually abraded during the course of the reaction. An excess of carbon dioxide was passed through the reaction mixture during the entire period. When all reaction appeared to have ceased, solids in the form of a sludge were filtered off and treated with a large excess of alcohol to decompose unreacted sodium. The alcoholic solution of those solids was acidified. The acidified solution was extracted twice with 50 cc. portions of diethyl ether and the extract evaporated to constant weight. The residue was a viscous golden-amber oil which could not be induced to crystallize. The oily unsaturated acids thus obtained had a neutralization equivalent of 193, though slight variations in reaction conditions have produced products possessing neutralization equivalents of from 100 to 300.

The amount of solvent employed in the reaction mixture may be varied considerably without departing from the scope of the invention. Sufficient solvent should be present to promote effectively the desired reaction. The amount used will generally be governed to some extent by the type of products desired, the particular reactants used, and the particular solvent chosen. In general the use of from 100 to 2000 cc. of solvent per mole of diolefine being reacted is recommended when no diluent solvent is employed. When a diluent is used along with the ether solvent, sufficient ether should be present to have an active promoting action upon the reaction.

The reaction is best carried out at temperatures of about 0 to 30° C. although higher or lower temperatures may be employed. In choosing the temperature at which reaction is to be effected, it should be kept in mind that temperature has an influence upon the molecular weight of the product acids. In general temperatures as low as −25 and up to the boiling point of the particular ether chosen may be used.

The individual acids which are produced by the reaction have not been isolated and definitely identified. It is expected that the acids, if isolated in pure form, would be solids at ordinary temperatures. However, such isolation has not been achieved and the reaction products in the form of crude mixtures are yellow brown oily liquids. All indications point to the acids being chiefly unsaturated dicarboxylic acids having average molecular weights in the range of about 200 to 500.

These mixed acid products are potentially useful as raw materials for the synthesis of plasticizers, drying oil esters, and polyester and polyamide resins.

The foregoing examples and specific embodiments of the invention are illustrative only and the invention is not intended to be limited thereby except as indicated by the appended claims.

I claim:

1. The method comprising reacting a monomeric acyclic aliphatic conjugated diolefine, an alkali metal selected from the group consisting of sodium and potassium, and carbon dioxide in a reaction medium which comprises an ether selected from the group consisting of aliphatic mono ethers having a $CH_3$—O— group and an oxygen to carbon ratio of not less than 1:4, and poly ethers derived from an aliphatic polyhydric alcohol having all of the hydroxyl hydrogen atoms replaced by alkyl groups.

2. The method of claim 1 wherein the reaction medium comprises an ethylene glycol dialkyl ether.

3. The method of claim 1 wherein the reaction medium comprises ethylene glycol dimethyl ether.

4. The method of claim 1 wherein the acyclic aliphatic conjugated diolefine is butadiene.

5. The method of claim 1 wherein the alkali metal is sodium.

6. The method comprising reacting butadiene, sodium and carbon dioxide in a reaction medium comprising an ethylene glycol dialkyl ether.

7. The method of claim 6 wherein the reaction medium comprises ethylene glycol dimethyl ether.

8. The method comprising reacting sodium with butadiene in a reaction medium comprising ethylene glycol dimethyl ether while continuously passing carbon dioxide into the reaction mixture, and converting the resultant solid reaction products by acidification to a mixture of organic acids.

9. A composition of matter comprising at least one dibasic acid having the formula:

$$HOOC.(CHR—CH=CHR)_n.COOH$$

wherein R represents hydrogen and aliphatic radicals and $n$ is a whole number greater than one and having a molecular weight within the range of about 200 to 500.

10. A composition of matter comprising at least one dibasic acid having the formula:

$$HOOC.(CH_2—CH=CH—CH_2)_n.COOH$$

wherein $n$ is a whole number greater than one and having a molecular weight within the range of about 200 to 500.

11. A composition of matter comprising at least one dibasic acid having the formula:

$$HOOC.(CH_2—CH=CH—CH_2)_n.COOH$$

wherein $n$ is a whole number from 2 to 8, inclusive and having a molecular weight within the range of about 205 to 500.

12. A composition of matter comprising a mixture of dibasic acids having the formula:

$$HOOC.(CH_2—CH=CH—CH_2)_n.COOH$$

wherein $n$ is a whole number greater than one and having a molecular weight within the range of about 200 to 500.

JOSEPH FREDERIC WALKER.

CERTIFICATE OF CORRECTION.

Patent No. 2,352,461. June 27, 1944.

JOSEPH FREDERIC WALKER.

It is hereby certified that error appears in the printed specification of the above numbered patent requiring correction as follows: Page 3, second column, line 57, claim 11, for "205 to 500" read --200 to 500--; and that the said Letters Patent should be read with this correction therein that the same may conform to the record of the case in the Patent Office.

Signed and sealed this 15th day of August, A. D. 1944.

Leslie Frazer (Seal) Acting Commissioner of Patents.